Patented May 9, 1933

1,907,855

UNITED STATES PATENT OFFICE

MARTIN MUELLER-CUNRADI, OF LUDWIGSHAFEN-ON-THE-RHINE, AND HANNS SOENKSEN, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF 1.3-BUTYLENEGLYCOL

No Drawing. Application filed September 6, 1928, Serial No. 304,380, and in Germany October 13, 1927.

We have found that 1.3-butyleneglycol can be obtained by the catalytic reduction of aldol, without any appreciable secondary reactions occurring, by passing the aldol, in the liquid form, in conjunction with hydrogen or gases containing the same at a temperature above 50° C. over a hydrogenating catalyst which assists in the reduction of the aldol. The catalysts hitherto employed for hydrogenation which are suitable for the purposes of the present invention comprise for example nickel, cobalt or copper and mixtures thereof and also additions of activators such as alumina and the like, carriers for the catalytic substances being employed, if desired. It has further been found especially suitable to work with an amount of hydrogen or gases containing the same in excess of that required for the reduction and at an elevated pressure, which may amount from 20 to 100 or even more atmospheres, according to the nature of the catalyst and the temperature employed. Generally it is advisable to work at a pressure from about 100 to 200 atmospheres and at a temperature of from 50° to about 110° C. The aldol may be used by itself, or diluted with water or other solvents, such as alcohols or other inert solvents. When working in the aforesaid manner it is generally not necessary to remove beforehand the condensing agent employed in preparing the aldol, all that is necessary in this case consisting in compensating the action of the usually alkaline condensing agent, as for example by neutralization. The yield per unit of time and space obtained according to this invention is a multiple of that secured by the methods previously known.

The following example will further illustrate the nature of the said invention which however is not limited thereto.

Example

A catalytic mass consisting of nickel to which a small percentage, say 3 per cent, of aluminum oxid has been added, and which is deposited on a solid carrier, such as porcelain balls or active silica, is placed in a reaction vessel in the form of a tower adapted to stand high pressure. Neutralized crude aldol, of about 50 per cent strength and freed from acetaldehyde is passed over the catalytic mass at about 110° C. whilst at the same time hydrogen is passed through the vessel, and the pressure is maintained at about 100 atmospheres. There are no substantial secondary reactions, and 1.3-butyleneglycol is obtained as the reaction product.

What we claim is:

1. The process of producing 1.3-butyleneglycol from aldol which comprises continuously passing aldol in conjunction with hydrogen at a temperature between 50° and about 110° C. through a reaction vessel containing a hydrogenating catalyst.

2. The process of producing 1.3-butyleneglycol from aldol which comprises continuously passing aldol in conjunction with gases containing hydrogen at a temperature between 50° and about 110° C. through a reaction vessel containing a hydrogenating catalyst.

3. The process of producing 1.3-butyleneglycol from aldol which comprises continuously passing a mixture of aldol with an inert diluent in conjunction with hydrogen at a temperature between 50° and about 110° C. through a reaction vessel containing a hydrogenating catalyst.

4. The process of producing 1.3-butyleneglycol from aldol which comprises continuously passing a mixture of aldol and an alcohol in conjunction with hydrogen at a pressure above 20 atmospheres and at a temperature between 50° and about 110° C. through a reaction vessel containing a hydrogenating catalyst.

5. The process of producing 1.3-butyleneglycol from aldol which comprises continuously passing aldol in conjunction with hydrogen at a pressure above 20 atmospheres and at a temperature between 50° and about 110° C. through a reaction vessel containing a hydrogenating catalyst comprising a heavy metal and an activator.

6. The process of producing 1.3-butyleneglycol from aldol which comprises continuously passing aldol in conjunction with hydrogen at a pressure between 20 and about 200 atmospheres and at a temperature between 50° and about 110° C. through a reaction vessel containing a hydrogenating catalyst comprising a heavy metal and a metal oxid.

7. The process of producing 1.3-butyleneglycol from aldol which comprises continuously passing aldol in conjunction with hydrogen at about 100 atmospheres and at about 110° C. through a reaction vessel containing a catalyst comprising nickel and aluminium oxid, deposited on a solid carrier.

In testimony whereof we have hereunto set our hands.

MARTIN MUELLER-CUNRADI.
HANNS SOENKSEN.